(12) United States Patent
Saunders

(10) Patent No.: US 6,490,501 B1
(45) Date of Patent: Dec. 3, 2002

(54) CURE MONITORING AND CONTROL SYSTEM

(75) Inventor: Arven H. Saunders, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 09/413,739

(22) Filed: Oct. 6, 1999

(51) Int. Cl.[7] ............................................... G06F 19/00
(52) U.S. Cl. .................. 700/198; 700/197; 700/30; 700/31; 700/118; 700/119; 700/204; 29/848; 29/849; 29/856; 29/858; 264/40.1; 264/40.5; 264/325; 264/236; 426/512; 426/513; 426/517
(58) Field of Search ........................... 700/28, 29, 30, 700/31, 117, 118, 119, 123, 198, 197, 199, 200, 202, 204; 29/848, 849, 856, 858, 859, 888.047, 888.072, 888.127, 898.049; 65/404, 64; 156/237, 143; 425/149; 426/512–517; 264/40.1–40.5, 325, 236

(56) References Cited

U.S. PATENT DOCUMENTS

| | | | |
|---|---|---|---|
| 4,344,142 A | * 8/1982 | Diehr et al. ................ 264/325 |
| 4,494,408 A | * 1/1985 | DeLacy ...................... 264/40.1 |
| 4,515,545 A | * 5/1985 | Hinrichs et al. ............ 425/143 |
| 4,800,050 A | 1/1989 | Ortwin ....................... 264/40.6 |
| 4,810,438 A | * 3/1989 | Webster et al. ............. 264/236 |
| 4,828,472 A | * 5/1989 | Itoh et al. ................... 264/40.5 |
| 4,924,785 A | * 5/1990 | Schultz et al. .............. 110/229 |
| 5,158,720 A | * 10/1992 | Levy ..................... 250/227.14 |
| 5,207,956 A | * 5/1993 | Kline et al. ................. 264/236 |
| 5,219,498 A | * 6/1993 | Keller et al. .................. 156/64 |
| 5,345,397 A | 9/1994 | Handel et al. .............. 364/503 |
| 5,453,226 A | 9/1995 | Kline et al. ................ 264/40.1 |
| 5,680,315 A | * 10/1997 | Rimondi et al. ........... 264/40.1 |
| 5,784,283 A | 7/1998 | Rimondi et al. ....... 364/475.03 |

* cited by examiner

*Primary Examiner*—Ramesh Patel
(74) *Attorney, Agent, or Firm*—Melvin A. Hunn; James E. Walton; Hill & Hunn, LLP

(57) ABSTRACT

A monitoring and control system for use in curing composite materials includes a model for a workpiece being cured. The model calculates current internal states of the workpiece and predicts, based upon past and current states of the workpiece, future states of the cure process. These future states are represented as virtual inputs to the controller, which controls operation of the cure process based upon both real and virtual inputs. Cure rates are affected by both external temperatures and internal heat generated by the curing process itself. The internally generated heat is considered by the model when calculating current states and predicting future states. By projecting the cure state into the future, problems caused by high cure rates can be avoided. In addition, pressure can be optimally controlled in response to estimated internal material state.

14 Claims, 2 Drawing Sheets

FIG. 4

|  | Seg1 | Seg2 | Seg3 | Seg4 | Seg5 | Seg6 | Seg7 |
|---|---|---|---|---|---|---|---|
| Seg Time | ---- | ---- | ---- | ---- | 2H | ---- | END |
| Temp Control T/C | LEAD | ---- | ---- | ---- | ---- | ---- | ---- |
| Rate | ---- | 5 | ---- | ---- | ---- | ---- | ---- |
| Value | CURR | 350 | ---- | ---- | ---- | 150 | ---- |
| Pressure Rate | 5 | ---- | 3 | ---- | ---- | ---- | ---- |
| Pressure Value | 15 | ---- | 85 | ---- | ---- | ---- | 0 |
| Watch #1 | ---- | MVDLT | PRESS | LAG | ---- | LAG | ---- |
| Criterion (if) | ---- | <.1 | >80 | >345 | ---- | <150 | ---- |
| Action (then) | ---- | AND | GO | GO | ---- | GO | ---- |
| Watch #2 | ---- | MVM | ---- | ---- | ---- | ---- | ---- |
| Criterion (if) | ---- | <4.5 | ---- | ---- | ---- | ---- | ---- |
| Action (then) | ---- | GO | ---- | ---- | ---- | ---- | ---- |
| Blower Fan | ON | ---- | ---- | ---- | ---- | ---- | OFF |
| Heat Enable | ON | ---- | ---- | ---- | ---- | ---- | OFF |
| CureRate Cntl Enable | OFF | ---- | ---- | ON | ---- | ---- | ---- |
| CureRate Limit | ---- | ---- | ---- | 2 | ---- | ---- | ---- |
| Deg Cure Cntl Enable | ON | ---- | ---- | OFF | ---- | ---- | ---- |
| Deg Cure Limit | 2 | ---- | ---- | ---- | ---- | ---- | ---- |

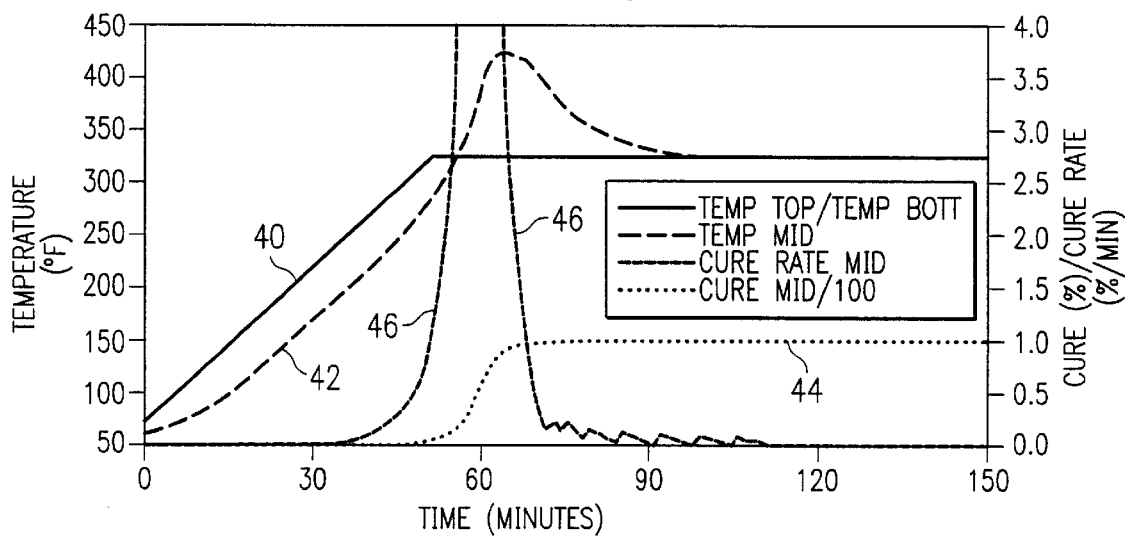

| MATERIAL SYSTEM | LAMINATE THICKNESS (PLIES) | MINIMUM LEAD TIME (MIN) |
|---|---|---|
| S2/8552 | 32 | 15 |
|  | 64 | 35 |
|  | 128 | 60 |
| IM6/3501-6 | 32 | 10 |
|  | 64 | 20 |
| T650/5250-4 | 32 | 10 |
| FM 300 | 32 | 20 |
|  | 64 | 60 |

CURE MONITORING AND CONTROL SYSTEM

BACKGROUND OF THE INVENTION

1. Field of the Invention:

The present invention relates generally to industrial process control, and more specifically to a technique for controlling a cure process for fiber composite materials.

2. Description of the Prior Art:

In the aerospace industry, as well as many other industries, fiber composite materials are continuing to become of increasing importance in the fabrication of a wide variety of products. Use of composite materials often provides higher strength to weight ratios than previously obtainable. In addition, complex shapes, which cannot easily be formed in other materials, are achievable.

Forming composites requires that thermosetting polymer resins (matrices) be cured (polymerized) in situ with reinforcing fibers. The challenge for a cure control system is to yield an acceptably cured part while controlling only temperature, pressure and vacuum over time. The goals of a successful cure are good consolidation with low porosity (voids) and high degree of cure. To do so successfully requires managing the interactions of temperature distribution, degree of cure, laminate thickness, and void content in real time.

The typical approach to developing a cure process uses trial and error with past experience to arrive at a successful cure process, or recipe. Thicker parts are particularly difficult, since a slow or controlled heat up rate is required to cure the part, but it is difficult to predict what heat rate to use that will efficiently cure the part while not overdriving the heating and causing uncontrollable exotherm.

Once a successful process recipe has been found, industrial PID (proportional-integral-derivative) feedback controllers are typically used to follow the specific time-temperature-pressure-vacuum sequence over time. While conventional controllers do an admirable job of carrying out the recipe, they are programmed to faithfully follow the fixed and predetermined sequence of set points throughout the cure. Thus, they are not flexible or adaptive to inevitable variations in materials batch and condition that occur within a manufacturing setting. Other than whatever time that is necessary to heat up to a soak or dwell and cool down the part, the process is followed rigidly and does not vary.

More sophisticated approaches to composite cure control are described in U.S. Pat. Nos. 5,345,397 and 5,453,226. The processes described in these patents utilize computer control to modify operation of the cure process based upon workpiece parameters measured during the process. This can provide improved process control. However, techniques such as these suffer from a number of important drawbacks.

The '397 patent utilizes a type of modeling to predict or estimate laminate temperatures in real time. This is done to calculate an autoclave set point. However, this patent appears to be directed only to relatively thin parts, and does not perform any look ahead to compensate for the exotherm issue. In addition, the description of the '397 patent does not apply any techniques to a press, nor control pressure or otherwise react to viscosity of the workpiece.

The '226 patent selects from a set of preselected cure cycle recipes. If temperature travels outside a selected range, a new recipe is followed. There appears to be no predictive function based on real time status of the workpiece. Neither reference provides a predictive model which can avoid future problems regarding the exotherm problem.

Currently available cure techniques are particularly deficient when used with relatively thick parts. These thick parts are particularly susceptible to uncontrollable exotherm, and are presently cured slowly in order to avoid it. A control technique which better managed the curing process for such thick parts would improve product quality while decreasing cure process time for such thick parts.

It would be desirable to provide a process control technique which enables accurate and robust process control for curing fiber composite parts, including relatively thick workpieces. It would also be desirable for such a control technique to provide optimal cure of a workpiece, allowing optimization of Tg, degree of cure, and fiber fraction part parameter values.

SUMMARY OF THE INVENTION

In accordance with the present invention, a monitoring and control system for use in curing composite materials includes a model for a workpiece being cured. The model calculates current internal states of the workpiece and predicts, based upon past and current states of the workpiece, future states of the cure process. These future states are represented as virtual inputs to the controller, which controls operation of the cure process based upon both real and virtual inputs. Cure rates are affected by both external temperatures and internal heat generated by the curing process itself. The internally generated heat is considered by the model when calculating current states and predicting future states. By projecting the cure state into the future, problems caused by high cure rates can be avoided. In addition, pressure can be optimally controlled in response to estimated internal material state.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a data table representative of a curefile used by the controller of the preferred embodiment;

FIG. 5 is a graph illustrating a hypertherm condition in a workpiece; and

FIG. 6 is a table showing minimum lead times for various material systems.

DESCRIPTION OF THE PREFERRED EMBODIMENT

Development of a system such as described herein includes several components. A number of these will be described in the following text in order to better clarify the functionality and application of the inventive control process. Some of the steps involved in devising the system include characterization of the materials to be used, development of models describing the curing process for these materials, and the selection of appropriate sensors to enable the desired degree of process control. Following this background material, a more detailed description of the resulting control system is provided.

Material Characterization

The preferred control system can be used with a variety of different materials. When developing the preferred embodiment, material characterization was conducted to investigate and understand the behaviors of each of 4 selected materials in response to changes in temperature. Available data for each material type was reviewed at the outset. For each material type, material batch, number of days of room temperature out time, and moisture content were varied over the tests conducted.

Figure 1:
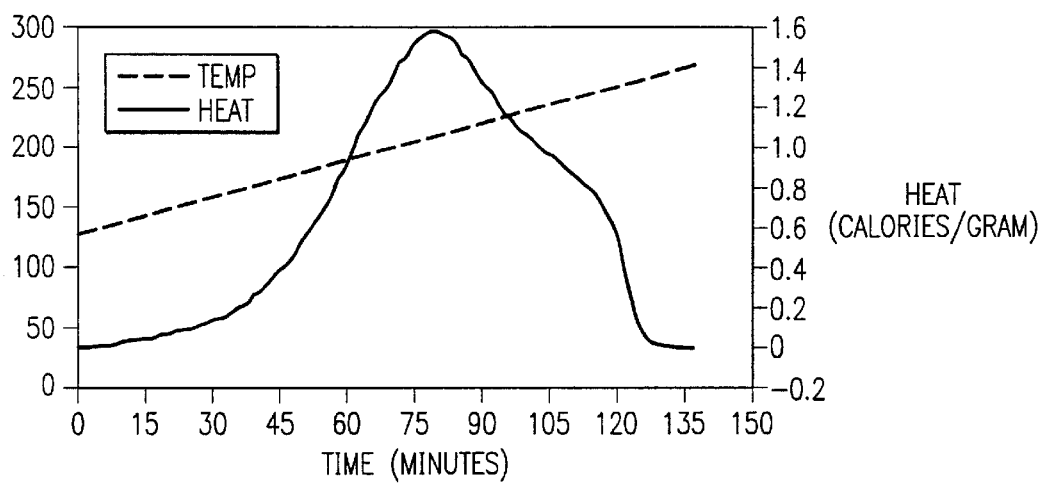
FIG. 1 is a graph showing a DSC result for a selected material.

The cure reaction analysis utilized a differential scanning calorimeter (DSC) to characterize each resin's cure reaction response to changes in temperature over time. The DSC instrument measures the heat flow (in calories/gram) of the cure reaction as a function of temperature. Reaction rates were measured for all 4 selected materials using five DSC temperature ramp rates of 10, 5, 2, 1, and 0.4° C./minute. A typical DSC result is shown in FIG. 1 for S2/8552 material undergoing a temperature ramp of 5° F. per minute from 100 to 300° C. The rate of heat generated is proportional to the rate of the cure reaction. The area under the heat curve is indicative of the ultimate heat that is generated by the resin per unit weight.

A rheological assessment was made which utilized a rheometric dynamic (mechanical) spectrometer (RDS) to investigate how the resin flow and viscosity characteristics change with temperature. This instrument measures the viscoelastic properties of the resin while subjecting it to a temperature change and an oscillatory torsional load. Modifications were made to the instrument so that DC resistance of the material sample could be measured in conjunction with (complex) viscosity (poise) and temperature. Such typical modifications are known to those skilled in the art.

The data generated during material characterization formed the basis for understanding material behaviors. The test data obtained provided the foundation for correlating various useful sensor measurements with actual observed behaviors and properties. They have also provided the context in which sensors are to operate and be evaluated. Finally, the quantitative analyses of these data laid the groundwork for the development of models that were to be used to monitor and control the cure process.

Model Development and Validation

Models were developed from the data obtained during material characterization. Since there are limitations in what can be sensed and the locations where sensors can be employed, and sensors are unable to predict future resin states, models were developed to augment the input data from sensors to provide a more complete view of the state of the cure. The principal application of models was for assessment of cure reaction and resin state.

Numerous models are suitable for use as process control models. Some useful models are described and referenced in U.S. Pat. No. 5,453,226, previously referenced herein. For the preferred embodiment, attention was focused on two model forms; an analytical model and a neural network functional model.

The cure model that was developed using these forms computes the temperature distribution, degree of cure, viscosity, and DC resistance of a composite as functions of position within the laminate and time. The resin degree of cure is calculated as a function of time, temperature, and reaction rate.

The reaction rate model that was determined from the DSC data required selection of a functional form. Both analytical and neural network functional model forms were considered, and the resin kinetics data were fitted to both types of models. The neural network model predicts the reaction rate given the temperature and degree of cure. It was trained using all five ramp rate sets of DSC data, similar to that shown in FIG. 1. The analytical form used for estimation of reaction rate is an Arhennius model, valid for many addition reaction materials (e.g. epoxies). The general form of an Arhennius model is $$\frac{d\alpha}{dt} = (Ae^{-E_a/RT}(1-\alpha))^n$$

where $\alpha$ is the degree of cure, A is the preexponential factor, E is the activation energy, n is the power or order of the reaction, and RT is a constant that varies with the current temperature.

Figure 2:
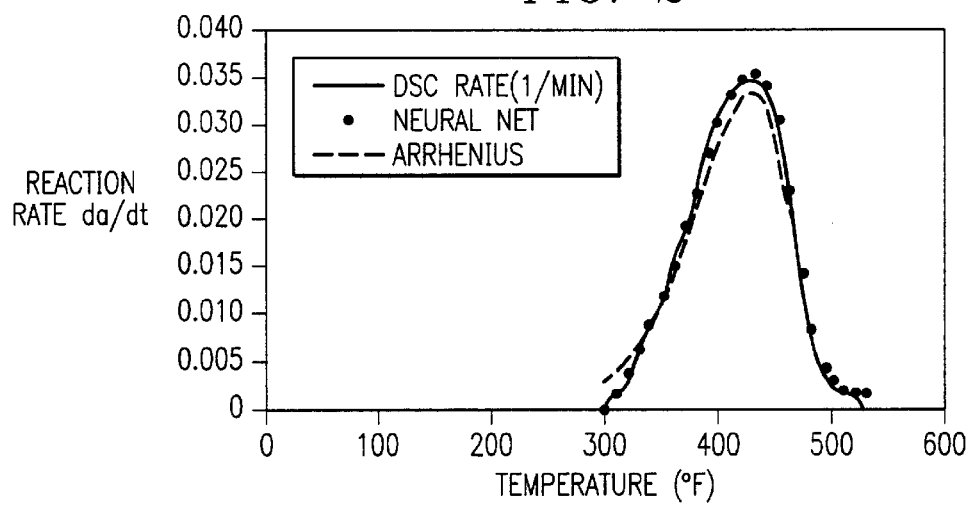
FIG. 2 is a graph showing several different cure rates.

Comparison between the Arrhenius and neural net reaction rate model predictions for the T650/5250 (BMI) material are shown in FIG. 2. The figure illustrates the agreement between the original DSC data and the predicted values for reaction rate ($d\alpha/dt$, where $\alpha$ represents percent cure for the resin). As evidenced in the figure, both model approaches provide adequate fits of the data.

The Arrhenius model predictions for cure, viscosity, and DC resistance were found to agree very well with the actual characterization data. These models have been incorporated into the ACCM controller so that real-time estimates of these parameters may be maintained. As will be appreciated by those skilled in the art, other models could be selected if desired.

Sensor Evaluation

Critical elements to process control are the sensors, which are used to recognize important changes which take place in the material during cure. The following listed parameters are among the most important in regard to the state of the cure process, especially for the resin:

Temperature

Degree of cure

Glass transition temperature (Tg)

Viscosity

Hydrostatic pressure

A number of sensors are suitable for use with the preferred embodiment of the present invention, and testing revealed several which were particularly suitable. Based on the available sensors that were evaluated, thermocouples were selected as the primary sensor to provide input for the model. These sensors provide essential part temperature and temperature distribution data. The preferred model is a temperature based model, so that these are the only sensors required for input to the model. Use of temperature sensors only gives good results. However, other sensor types can be used as desired in the same manner as described herein.

Control System Description

Figure 3:
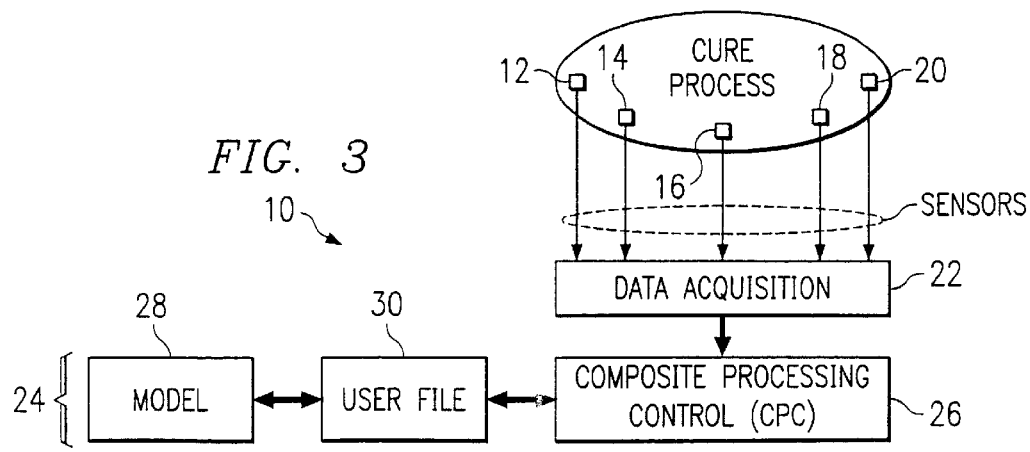
FIG. 3 is a block diagram of a preferred control system in accordance with the present invention.

FIG. 3 depicts a preferred Adaptive Control Cure Monitoring (ACCM) system architecture 10. The cure process is monitored by various sensors 12, 14, 16, 18, 20; their input data is conditioned by the data acquisition unit 22, and routed to the Composite Processing Control (CPC) module 24. Three software components comprise the ACCM system. The foundation is provided by the CPC control module 26, which utilizes closed-loop control of temperature, pressure, and vacuum, and provides the user interface via screen displays, keyboard, and mouse. The model 28 provides estimates of current as well as future temperature, cure rate, degree of cure, and viscosity. The third component is the user file 30 that is used to customize the control logic. The combination of these three components into ACCM allows sensor input data to be integrated with model-based or derived data.

The model uses a finite element approach to estimating resin state. The thickness of the laminate to be cured is divided into a number of layers or nodes, normal to the surface, each infinitesimally thick. Temperature boundary conditions (nodes) represent the effects of heat being transferred to the external surfaces of the laminate, from the surrounding air, as in an oven or autoclave, or contacting platen surface, in the case of a bonding press. By estimating the amount of heat being conducted through the laminate from the boundary layers, as well as the heat being generated from the cure reaction, the model calculates the temperature for all nodes in real-time. Once the temperature of each node has been estimated, its degree of cure, viscosity, and DC resistance can be calculated.

The user file is used to customize the operation of the system by introducing user-defined control. This code serves as the interface between the CPC module and the model, in that this file sends requests and parameter values to the model, and receives the estimate/prediction values in return. A prime parameter that is set by the user in this file is the lead time limit, the maximum amount of time that the control algorithm will look in the future for calculating predictions. The user also defines the laminate to be cured in this code by specifying:

the material system for each layer of the laminate the laminate thickness part thermocouples to be used as boundary temperature conditions the number of nodes to be used in the model the starting condition of the material ACCM provides for two modes of control-cure control and cure rate control. Cure control is used typically early in the cure where a limit on the advancement of the cure must be maintained. This is useful for preparing the resin for pressurization as viscosity is declining. Cure rate control is used relatively later in the process where control of exotherm is paramount. This mode provides for a limitation of the rate of cure as the mechanism for maintaining control of the rate of the cure and the subsequent release of heat that is proportional to the reaction rate. An example of process operation taking these variables into account is given below.

The curefile is used to specify the cure recipe of temperature, time, and pressure requirements for the particular material system being cured. It is also used to invoke degree of cure and cure rate control. A typical ACCM curefile strategy utilizes both degree of cure and cure rate modes. An example curefile is given in FIG. 4, and illustrates overall operation of the control system.

FIG. 4 is a simple curefile which contains the information used to control operation of the cure process. The curefile values are used by the controller to set targets and setpoints, and to monitor conditions relevant to the process. The controller operates on this curefile to monitor the state of the cure process, and determine when the process setpoints must be changed.

The curefile reflects the progression of the process itself. As shown in FIG. 4, the curing process is preferably divided into a number of segments, with 7 segments being shown in FIG. 4. In each segment, various values are controlled or monitored to determine when the segment is complete. A value set in a previous segment continues unchanged in following segments in entries indicated by dashes.

The first segment Seg1 is the segment for initializing the cure process. Control value seg time is not used for this segment. As known in the art, one thermocouple is designated the LEAD thermocouple, and is typically the one which reads highest of several thermocouples. In Seg1, the LEAD thermocouple has its setpoint initialized to the current (CURR) temperature of the workpiece. The pressure value is set to 15 psi, to increase at a rate of no more than 5 psi/min.

As shown by the watch #1 and watch #2 sections, no watches are performed during the initialization segment Seg1. The blower fan and heat enable controls are turned on, allowing heat to be applied to the oven or autoclave. The cure rate control enable is turned off, and the degree of cure control enable is turned on. The degree of cure limit is set to 2%. This means that the degree of cure will be limited to 2% cure of the workpiece until the degree of cure control enable is turned off in Seg4. As described below, the cure rate limit and degree of cure limit relate to values generated by the model for use during the control process.

Once all controls have been initialized, control passes to Seg2. At this time, the value of the temperature is set to 350° F., to increase at a rate of no faster than 5°/min. Pressure remains constant. The criteria for watch #1 and watch #2 are used to determine when it is time to move control from Seg2 to Seg3. In the example of FIG. 4, two separate criteria must be met before control passes from Seg2 to Seg3. As shown, the variable MVDLT must reach a value less than 0.1, and the variable MVM must reach a value less than 4.5 to proceed to Seg3. Both MVDLT and MVM are variables generated by the model based upon workpiece temperatures sensed by the thermocouples attached to the workpiece. MVM is a modeled viscosity at midplane value, which is a calculated viscosity value at the center (middle plane) of the workpiece according to the model. This watch criteria is met only if, in this example, the MVM drops below a value of 1n(poise)=4.5. As the workpiece is initially heated, the viscosity drops as the resin melts. MVDLT represents the modeled maximum internal differential of viscosity between any two model nodes. Once 1n(poise)<0.1, the initial melt of the resin has become consistent throughout the workpiece.

Although the temperature value is being driven to 350°, at a rate not to exceed 5°/min, the temperature will tend to level off as the 2% degree of cure is approached. This leveling is performed by the PID as part of its normal, well known operation in response to the 2% degree of cure setpoint provided by the curefile. Because the degree of cure is a function of the amount of heat which has been applied to the part, as described below, temperature may well level off at a temperature lower than 350° once the 2% degree of cure limit has been approached. In typical, thick workpieces, a 2% degree of cure may well be reached when the thermocouple temperature reaches only 200°.

Once both watch criteria have been met, the action GO is performed, indicating control passes to Seg3. Within Seg3, pressure is increased to 85 psi, at a maximum increase rate of 3 psi/min. This action is used to apply pressure to the workpiece when it is uniformly melted to consolidate the fibers and resin. The even melt condition required to exit Seg2 is needed for this to be performed properly. No other values change during this segment. Watch #1 criteria, the only watch performed during Seg3, is used to ensure that the actual pressure on the workpiece is greater than 80 psi before continuing on to Seg4.

In Seg4, the watch criterion is based upon a LAG thermocouple passing a temperature of 345° F. When Seg4 is entered, the degree of cure control enable is disabled, so that the absolute degree of cure is no longer a control variable. Instead, in Seg4, cure rate control enable is turned on and the cure rate limit is set to 2%/min. This means that, based upon the model, the cure rate of the workpiece is not allowed to increase at a rate more than 2% of cure during a minute. Because the absolute degree of cure controls have been turned off, temperature within the oven or autoclave will be increased to a set point of 350°, at a rate not exceeding 5°/min as described previously, in order to begin significant curing of the workpiece.

As described below in more detail, the model also projects cure rate for the workpiece for sometime into the future. The predicted cure rate may be substituted for the present calculated rate under certain conditions, as will be described.

As known in the art, the LAG thermocouple is that thermocouple of the several attached to the workpiece, which registers the lowest temperature of the several thermocouples. Basing the watch on the LAG thermocouple ensures that the minimum surface temperature of the device is at least 345° F. As described previously, the lead thermocouple, the first to reach a set temperature, is the thermocouple used to increase to, and hold at, the 350° setpoint described previously. Once the lag thermocouple reaches a temperature greater than 345°, control passes to Seg5.

Seg5 is set by the segment time control to be a fixed time of 2 hours. Although a fixed time is shown in the example of FIG. 4, another determination which can be used for this segment is to control the degree of cure. By setting a watch criteria based upon the degree of cure, and setting it at a preselected value, such as 96%, the cure of Seg5 can remain in effect until the preselected degree of cure has been reached.

In either event, Seg5 is the primary curing segment of the process. During Seg5, the primary control other than the normal temperature controls as known in the art, is the control based upon the cure rate limit. The cure rate limit is a modeled number based upon the cure rate currently being experienced by the workpiece. If this limit increases too quickly, run away exotherm can occur which can damage or ruin the workpiece. If the predicted cure rate at any future time exceeds the cure rate limit, 2% in this example, the temperature will be lowered now until the future cure rates fall below the set cure rate limit.

Once Seg5 has been completed, control passes to Seg6. During this segment, the workpiece is cooled down toward ambient. Because the rate value is unchanged, the rate does not drop more than 5°/min. A watch is kept on the LAG thermocouple, and control passes to Seg7 when the LAG thermocouple has reached a temperature less than 150°.

Within Seg7, the cure process has been completed. Pressure is turned off, as are the blower fan and heater. At this time, the oven, autoclave, or the tooling may be opened and the workpiece removed and left out to cool.

It will be appreciated by those skilled in the art that many different cure programs may be set in a curefile depending upon the desired parameters. For example, depending upon the material properties of the materials used in the workpiece, the cure rate limit could be set to a different number. The pressures and temperatures used, of course, will depend upon the workpiece itself and the materials used in its manufacture. A smaller or greater number of segments may be used in the control program. However, in general the cure program will be similar to that shown in FIG. 4 in its general aspects.

Control Issues

An objective of the ACCM system is to accommodate curing of materials with various out-times (OTs). Out-times are basically the length of time the materials used in the workpiece have been stored at room temperature under controlled conditions. Since ACCM uses models to predict the degree of cure (etc.) as the cure process proceeds, real-time estimation of cure depends on the material's degree of cure at the start of cure processing. The system is set up to accept user input of the cumulative number of days of room temperature OT, as this information is typically required to be tracked and recorded.

The degree of cure for material which has been stored is generally known as a function of the storage time, temperature, and storage humidity. If this degree of cure prior to beginning the cure process is known or calculable, it is used in conjunction with the model and the control curefile. If the degree of pre-cure is, for example, 5%, the curefile may be initially loaded with a degree of cure limit of 7% instead of the 2% described in connection with FIG. 4. If the amount of cure due to storage is unknown, the assumption can be made that the starting condition can be set to 0%, or some other appropriate small value.

One of the most important benefits of the present system and technique is the avoidance of hypertherm conditions, conditions in which the heat internally generated as a result of the curing process becomes too high and damages the workpiece. The rate of internally generated heat cannot be controlled once it becomes too high, so the hypertherm conditions must be avoided before they begin. This avoidance is obtained through the use of a predictive model used by the control system The predictive model uses a finite difference approach to the solution of the transient heat partial differential equation (the Arhennious equation described previously). In this solution, the thickness of the laminate to be cured is divided into a number of layers, or nodes, normal to the surface of the workpiece. Temperature boundary conditions represent the effects of heat being transferred to the external surfaces of the laminate. Transfer is from the surrounding air in an oven or autoclave, or the contacting platen surface in the case of a bonding press. By estimating the amount of heat being conducted through the laminate from the boundary layers, as well as the heat being generated from the cure reaction, the model calculates the temperature for all internal nodes in real time. Once the temperature of each node has been calculated, its degree of cure and viscosity can be calculated. As described above, these values are used as inputs to the controller.

The degree of cure and viscosity values, and the resulting cure rates, are calculated for the current time and for the future. For the current time, the past history of measured temperatures combine with the workpiece model to give the cure and viscosity values. For future times, the model assumes that the boundary conditions will remain constant, and calculates viscosity, degree of cure, and cure rates for future times. An appropriate timestep, such as a few seconds to a minute or more, can be used for future calculations, or a continuous calculation can be performed.

The future calculations are performed for a time period extending into the future from the current time. This period can vary depending on where the cure process currently is. For example, the most critical time periods are the first four segments as shown in FIG. 4, because by the time segment 5 is reached most of the high heats generated internally will already have occurred. The length of time into the future for which such calculations must be performed is, generally, long enough that any exotherm problems which might occur can be caught before it is too late to correct them. This is a time which preferably goes beyond the maximum cure rate which is expected for this workpiece, as predicted by the model. This is generally a period of a few minutes to perhaps an hour, and depends on the exothermic properties of the material used in the workpiece.

In the preferred embodiment, the higher of the current cure rate and the highest future projected cure rate is used as the feedback to the controller. In other words, the highest cure rate calculated for the future interval considered by the model is compared with the current cure rate, and the highest value of these two used by the controller. This ensures that the cure rate, even including the effects of internally generated heat, will never exceed the cure rate set point. If desired, more sophisticated calculations can be undertaken to maximize the present cure rate while avoiding exotherm, but the described approach has been found to be effective in actual practice.

The ACCM control system predicts the future state of the resin based on a prediction of future laminate temperatures. The future state is then used for determining what action the controller should take in the present, in order to maintain control of the process. To predict future temperature, the control algorithm projects out in time from the current temperature, using the current temperature rate. Once a future temperature has been predicted at that future time, estimates for the state of the resin cure, cure rate, viscosity, etc. may be calculated.

The rate of cure of the resin is a function of its current degree of cure and its temperature. For control of exotherm, at any point during the process of curing, it is imperative then to know not only what the current distribution of temperatures are within the laminate, but also what they are predicted to be in the future. There are 3 influences on temperature change: conduction of heat into the laminate from external sources, heat generated internally by the cure reaction, and heat sustained by the thermal mass of tooling (etc.) used. We will address the first 2 mechanisms only here.

During the early phase of the cure process, resin reaction rate is insignificant, and the laminate midplane temperature is determined by thermal conductivity of heat from the external or boundary condition (BC) layers of the laminate towards the centre. The rate of heat flow is proportional to the difference in temperature between the 2 layers and the laminate thickness. For a given material, the time delay or lag time between when the BC was at a certain temperature until the midplane attains this same temperature is a function of the ramp rate of the boundary and the thickness. In general, for a higher BC temperature rate, the midplane temperature rate will also be higher, and the amount of time delay will be less, depending on the thickness. A lower BC rate gives a larger time delay for the same thickness.

As the cure reaction begins to increase at the midplane, it becomes increasingly dominant in determining the midplane temperature. A higher reaction rate not only produces heat faster, but the additional heat tends to further accelerate the reaction rate, thereby compounding the rate of heat release, and so on. Thus awareness of the potential impact of reaction rate in the future is clearly essential to maintaining control of the cure.

Experiments were conducted utilizing a cure model simulator to analyze the relationships between material thickness, cure rate, and the ability to control. The insights gained from these simulations have been very useful, and have been implemented in actual system tests. In general, it is critical that the appropriate lead-time (minimum) be used for a particular material type and laminate thickness combination. Too short of a lead-time, and control can be lost to exotherm. In the same vein, specification of maximum cure rate is also critical, again for a particular material-thickness combination. Too small a cure rate may be an inefficient cure, while setting it too high can lead to uncontrolled exotherm.

An example of uncontrolled exotherm is given in connection with FIG. 5. FIG. 5 is a graph illustrating the results conducted on a part comprised of 128 plies of S2/8552 material. The laminate was ramped at a rate of 5° F./min and maintained at a constant temperature condition once the cure rate reached 1%/min. As shown by FIG. 5, the thermal momentum caused by the exothermic reaction of the material drove the cure rate to an unacceptably high value, much greater than 4%/min. At the same time, the midplaying temperature reached nearly 425° F. This type of situation, if allowed to occur, causes severe problems with the resulting workpiece.

In the Figure, curve 40 represents the top and bottom sensed temperatures, which should be the same. This temperature is directly indicative of the temperature being applied to the surface of the workpiece, and changes to reflect control of temperature in the oven. Curve 42 represents the mid-plane internal temperature of the workpiece, and is a calculated value based upon the model. Curve 44 represents the degree of cure of the workpiece, which is seen to approach unity as the workpiece becomes completely cured. Curve 46 extends off of the graph, and represents the cure rate at the mid-plane of the workpiece. Both degree of cure and cure rate are values calculated from the model.

As described above, the model projects into the future value such as the cure rate and internal temperature based upon the current state of the workpiece. In order to ensure that thermal runaway such as shown in FIG. 5 does not occur, it is important that the model project far enough into the future. Based upon test and simulations which have been run, a set of minimum lead-times, in minutes, has been developed for materials to which the process has been applied. These minimum lead-times are set forth in the table of FIG. 6 which identifies the material, a laminate thickness for the material, and a minimum lead-time in minutes.

The system and approach which has been described includes a simple model of the workpiece, representing layers within the workpiece. The model obtains a current state by iteration as the cure process progresses. The model calculates, on the basis of the current state and known properties of the materials used in the workpiece, absolute degree of cure, rate of change of cure, and other elements such as modeled internal temperatures. The controller uses these values, calculated by the model, as virtual inputs in the same manner as real inputs such as temperatures measured by thermocouples, are used.

In addition, the model runs continuously to project into the future what the calculated values will be based upon the current state. These projections are run into the future long enough to ensure that any undesirable exotherm conditions will be recognized. By utilizing projected future cure rate calculations as well as present cure rate calculations, the process controller is driven to compensate at the present time in order to prevent future problems. If present conditions are likely to lead to an exotherm condition in the future, the rate of present temperature increase can be lowered or stopped, or the present temperature can be lowered. As the present temperature rate of increase is changed, or the actual temperature value changed, the future projections of the model will, of course, change also. Once these projections indicate that exotherm is no longer a problem, no further changes need be made to current conditions. This results in a system which includes the predictive model in a control feedback loop.

The model itself is quite simple, using the Arhennius model iterated over time. Relatively small time increments, perhaps a few seconds or tens of seconds, can be used without becoming computationally intensive. Measured temperatures obtained from the thermocouples are compared to predicted values obtained form the model, with the model values being corrected on the fly to compensate for any differences. This keeps the model from drifting from actual process conditions. The model needs as inputs only temperatures measured from the thermocouples attached to the workpiece, so that the overall control system is inexpensive and robust.

In summary, the process control system incorporates a predictive model which generates feedback variables for use by the control system. This places the model into the feedback loop, so that values calculated and predicted by the model are used in controlling cure of the workpiece. The model operates in a continuous loop of reading current temperature values, calculating internal values for the present time, and predicting future states. The present and future calculated values are used by the controller in the same manner as sensed values.

While the invention has been particularly shown and described with reference to a preferred embodiment, it will be understood by those skilled in the art that various changes in form and detail may be made therein without departing from the spirit and scope of the invention.

What is claimed is:

1. A method for controlling cure of a composite material, comprising the steps of:

providing a predictive model of a workpiece;

sensing an input representing a current state of the workpiece;

calculating a value within the predictive model based upon the input, the calculated value representing an internal state of the workpiece;

projecting a future value of the calculated value; and controlling a state of the cure of a composite material based upon the input, the calculated value, and the future value.

2. The method of claim 1, further comprising the step of:

controlling a second state of the cure of a composite material based upon the calculated value.

3. The method of claim 2, wherein the calculated vale is a viscosity of the workpiece, and the second state is pressure applied to the workpiece.

4. The method of claim 1, wherein the input is temperature of a surface of the workpiece.

5. The method of claim 1, wherein the calculated value is a degree of workpiece cured.

6. The method of claim 1, wherein the calculated value is a cure rate of the workpiece.

7. The method of claim 1, wherein the future value is a cure rate of the workpiece.

8. The method of claim 1, wherein the future value is a degree of cure of the workpiece.

9. The method of claim 1, where the step of controlling a state of the cure of a composite material comprises controlling heat applied to the workpiece.

10. A system for curing a composite material workpiece, comprising:

a device for applying heat to the composite material workpiece;

at least one sensor for sensing temperature at a surface of the composite material workpiece;

a predictive model within a computer for calculating an internal state of the composite material workpiece in response to the sensed temperature from the sensor;

means for predicting future states of the composite material workpiece; and a controller responsive to the sensor, the predictive model, and the predicting means for controlling the heat applied to the composite material workpiece.

11. The system of claim 10, wherein the internal state calculated by the predictive model comprises a degree of cure for the composite material workpiece.

12. The system of claim 10, wherein the internal state calculated by the predictive model comprises a cure rate for the composite material workpiece.

13. The system of claim 10, wherein the predicting means comprises means for projecting composite material workpiece state into the future using the predictive model.

14. The system of claim 10, further comprising:

means for controlling pressure applied to the composite material workpiece, wherein the controller controls applied pressure in response to the calculated internal composite material workpiece state.

* * * * *